US011709506B2

United States Patent
Hilliges et al.

(10) Patent No.: US 11,709,506 B2
(45) Date of Patent: Jul. 25, 2023

(54) DRONE AND METHOD OF CONTROLLING FLIGHT OF A DRONE

(71) Applicant: ETH Zürich, Zürich (CH)

(72) Inventors: Otmar Hilliges, Zürich (CH); Tobias Nägeli, Zürich (CH)

(73) Assignee: ETH Zurich, Zurich (CH)

( * ) Notice: Subject to any disclaimer, the term of this patent is extended or adjusted under 35 U.S.C. 154(b) by 869 days.

(21) Appl. No.: 16/629,921

(22) PCT Filed: Jul. 12, 2018

(86) PCT No.: PCT/EP2018/068876
§ 371 (c)(1),
(2) Date: Jan. 9, 2020

(87) PCT Pub. No.: WO2019/012021
PCT Pub. Date: Jan. 17, 2019

(65) Prior Publication Data
US 2020/0409395 A1    Dec. 31, 2020

(30) Foreign Application Priority Data

Jul. 12, 2017 (EP) .................................. 17180855

(51) Int. Cl.
*G05D 1/10* (2006.01)
*B64C 39/02* (2023.01)
*G08G 5/00* (2006.01)
*G08G 5/04* (2006.01)

(52) U.S. Cl.
CPC .......... *G05D 1/102* (2013.01); *B64C 39/024* (2013.01); *G05D 1/106* (2019.05); *G05D 1/1064* (2019.05);
(Continued)

(58) Field of Classification Search
CPC .... G05D 1/102; G05D 1/1064; B64C 39/024; G08G 5/006; G08G 5/0069; G08G 5/045; B64U 2201/10
(Continued)

(56) References Cited

U.S. PATENT DOCUMENTS 6,144,338 A * 11/2000 Davies .................... G01S 19/40
342/357.33
10,157,545 B1 * 12/2018 Baker .................... B64C 39/024
(Continued)

FOREIGN PATENT DOCUMENTS

| EP | 0389318 A2 * | 9/1990 |
| EP | 2942688 A1 | 11/2015 |
| WO | WO-2016/053194 A1 | 4/2016 |

OTHER PUBLICATIONS

International Search Report and Written Opinion for PCT/EP2018/068876, dated Oct. 18, 2018, 9 pages.
(Continued)

*Primary Examiner* — Isaac G Smith
(74) *Attorney, Agent, or Firm* — Blank Rome LLP (57) ABSTRACT

According to the present invention there is provided a drone (1) comprising one or more propellers (2) and one or more actuators (3) for actuating said one or more propellers (2) to generating a thrust force which enables the drone (1) to fly; a controller (4) which is configured such that it can control the flight of the drone (1), wherein the controller (4) comprises a memory (6) having stored therein a plurality of predefined sets of positions which define a virtual rail which can be used to guide the flight of the drone (1) so that the drone can avoid collision with an subject; and wherein the controller further comprises a mathematical model (7) of the drone; wherein the controller (4) is configured to control the flight of the drone by performing at least the following steps, (a) approximating lag error based on the position of the
(Continued)

drone (1) measured by a sensor (5) and the virtual rail, wherein the lag error is the distance between a point along the virtual rail which is closest to the drone (1) and an estimate of said point along the virtual rail which is closest to the drone (1); (b) approximating a contour error based on the position of the drone (1) as measured by a sensor (5) and the virtual rail, wherein the contour error is the distance between a point along the virtual rail which is closest to the drone (1) and the position of the drone (1); (c) defining a cost function which comprises at least said approximation of the lag error and said approximation of the contour error; (d) minimizing the defined cost function, while also respecting at least limitations of the drone which are defined in said mathematical model, to determine a plurality of control inputs over a predefined time period into the future, and (e) applying the first control input only to the one or more actuators (3). There is further provided a corresponding method for controlling the flight of a drone.

15 Claims, 2 Drawing Sheets

(52) U.S. Cl.
CPC ............ *G08G 5/006* (2013.01); *G08G 5/0069* (2013.01); *G08G 5/045* (2013.01); *B64U 2201/10* (2023.01)

(58) Field of Classification Search
USPC .............................................................. 701/2
See application file for complete search history.

(56) References Cited

U.S. PATENT DOCUMENTS

2016/0140851 A1  5/2016  Levy et al.
2016/0293018 A1  10/2016  Kim et al.

OTHER PUBLICATIONS

E. C. Kerrigan, et al., "Soft Constraints and Exact Penalty Functions in Model Predictive Control," Control 2000 Conference, Cambridge, 2000, 6 pages.

* cited by examiner

DRONE AND METHOD OF CONTROLLING FLIGHT OF A DRONE

RELATED APPLICATIONS

This application is national phase of International Application No. PCT/EP2018/068876, filed on Jul. 12, 2018, which claims priority to European Patent Application No. EP17180855.3, filed on Jul. 12, 2017. The entire contents of those applications are hereby incorporated by reference.

FIELD OF THE INVENTION

The present invention concerns a drone which has a controller which is configured to use predefined sets of positions which define a virtual rail, to guide the flight of the drone. There is further provided a corresponding method for controlling the flight of a drone.

DESCRIPTION OF RELATED ART

With the advent of the use of drones for applications such as package delivery, and the use of drones which have a mounted camera for filming, it is evident that drones are being used more frequently in areas which are occupied by many people or areas where there are a lot of objects (such as buildings). Controlling the flight of the drone so as to avoid collision with people or objects is essential. Existing controllers which are used to control the flight of drones do not provide satisfactory levels of safety for many applications.

Additionally, typically in the field of cinematography a plurality of drones each having a mounted camera, are flown simultaneously so as to capture images of a subject from different views. Firstly, with existing drones (and their controllers), there is a high risk that the drones will collide with each other. Secondly, very often one drone will move into the field of view of the camera of another drone, thereby spoiling the images captured by the camera of said other drone.

It is an aim of the present invention to obviate or mitigate at least some of the disadvantages associated with existing drones and their controllers.

BRIEF SUMMARY OF THE INVENTION

According to the invention, these aims are achieved by means of a drone comprising one or more propellers and one or more actuators for actuating said one or more propellers to generating a thrust force which enables the drone to fly; a controller which is configured such that it can control the flight of the drone, wherein the controller comprises a memory having stored therein a plurality of predefined sets of positions which define a virtual rail which can be used to guide the flight of the drone so that the drone can avoid collision with an subject; and wherein the controller further comprises a mathematical model of the drone; wherein the controller is configured to control the flight of the drone by performing at least the following steps, (a) approximating a lag error based on the position of the drone measured by a sensor and the virtual rail, wherein the lag error is the distance between a point along the virtual rail which is closest to the drone and an estimate of said point along the virtual rail which is closest to the drone;

(b) approximating a contour error based on the position of the drone as measured by a sensor and the virtual rail, wherein the contour error is the distance between a point along the virtual rail which is closest to the drone and the position of the drone;

(c) defining a cost function which comprises at least said approximation of the lag error and said approximation of the contour error;

(d) minimizing the defined cost function, while also respecting at least limitations of the drone which are defined in said mathematical model, to determine a plurality of control inputs over a predefined time period into the future, and (e) applying the first control input only to the one or more actuators.

In one embodiment the drone further comprises a sensor mounted thereon, wherein the sensor is configured to measure at least the position of the drone. In another embodiment controller is configured to receive position information from a remote sensor (i.e. a sensor which is located remote to the drone, e.g. a sensor located on the ground or a sensor located on another drone) said position information containing a measure of the position of the drone. In another embodiment the sensor (either mounted on the drone or located remote to the drone) is configured to measure the velocity of the drone.

It should be understood that, when the controller minimizes the cost function this results in both control inputs over the predefined time period into the future and also predicted states (i.e. predicted positions and/or predicted speeds) which the drone is expected to have over that predefined period into the future. As mentioned only the first of the control input is applied to the actuators. The predicted states includes at least predicted positions of the done and/or in another embodiment the predicted states include both the predicted position and predicted velocity of the drone. The predicted states result due to the model predictive control algorithm which is used by the controller. In an embodiment, the controller inputs and the predicted states which result from minimizing the cost function define a plan for that drone.

In an embodiment the controller is configured to approximate the lag error ($\epsilon_l$) by, $$\epsilon_l(p,\theta)=\|r_{ps}^T n\|$$

wherein p is the position of the drone; $\theta$ is a rail parameter representing a point along the virtual rail; $r_{ps}$ is a relative vector between the virtual rail and the position of the drone, defined as $r_{ps}:=s(\theta)-p$; wherein p is the position of the drone; wherein $s(\theta)$ is a function representing the virtual rail; $s(\theta^*)$ is the point along the virtual rail which is closest to the drone; n is a tangent to the virtual rail; and wherein n is defined as $$n = \frac{s'}{\|s'\|} \text{ with } s' = \frac{\partial s(\theta)}{\partial \theta};$$

and the controller is configured to approximate the contour error ($\epsilon_c$) by, $$\epsilon_c(p,\theta)=\|r_{os}-(r_{ps}^T n)n\|$$

wherein p is the position of the drone; $\theta$ is a rail parameter representing a point along the virtual rail; $r_{ps}$ is a relative vector between the virtual rail and the position of the drone, defined as $r_{ps}:=s(\theta)-p$; wherein p is the position of the drone; wherein $s(\theta)$ is a function representing the virtual rail; $s(\theta^*)$ is the point along the virtual rail which is closest to the drone; n is a tangent to the virtual rail, wherein n is defined as $$n = \frac{s'}{\|s'\|} \text{ with } s' = \frac{\partial s(\theta)}{\partial \theta}.$$

In an embodiment the controller is further configured to, determine a $n^{th}$ order tailor approximation of the virtual rail to provide a differentiable path ($\sigma(\theta)$);
and wherein the controller is configured to approximate the lag error ($\epsilon_l$) by, $$\epsilon_l(p,\theta) = \|r_{ps}^T n\|$$

wherein p is the position of the drone; wherein $\theta$ is a parameter representing a point along the $n^{th}$ order tailor approximation of the virtual rail; $r_{ps}$ is a relative vector between the $n^{th}$ order tailor approximation of the virtual rail and the position of the drone, defined as $r_{ps}:=\sigma(\theta)-p$; wherein p is the position of the drone; wherein $\sigma(\theta)$ is a function representing the $n^{th}$ order tailor approximation of the virtual rail; $\sigma(\theta^*)$ is a point along the $n^{th}$ order tailor approximation of the virtual rail which is closest to the drone; and wherein n is the tangent to the $n^{th}$ order tailor approximation of the virtual rail and is defined as $$n = \frac{\sigma'}{\|\sigma'\|} \text{ with } \sigma' = \frac{\partial \sigma(\theta)}{\partial \theta}$$

and wherein the controller is configured to approximate the contour error ($\epsilon_c$) by, $$\epsilon_c(p,\theta) = \|r_{po}^T n)n\|$$

wherein p is the position of the drone; wherein $\theta$ is a parameter representing a point along the $n^{th}$ order tailor approximation of the virtual rail; $r_{ps}$ is a relative vector between the $n^{th}$ order tailor approximation of the virtual rail and the position of the drone, defined as $r_{ps}:=\sigma(\theta)-p$; wherein p is the position of the drone; wherein $\sigma(\theta)$ is a function representing the $n^{th}$ order tailor approximation of the virtual rail; $\sigma(\theta^*)$ is a point along the $n^{th}$ order tailor approximation of the virtual rail which is closest to the drone; and wherein n is the tangent to the $n^{th}$ order tailor approximation of the virtual rail and is defined as $$n = \frac{\sigma'}{\|\sigma'\|} \text{ with } \sigma' = \frac{\partial \sigma(\theta)}{\partial \theta}.$$

Preferably the determine a $n^{th}$ order tailor approximation of the virtual rail is a second order or great order tailor approximation of the virtual rail to provide a differentiable path ($\sigma(\theta)$). Most preferably the controller is configured to determine a second order tailor approximation of the virtual rail to provide a differentiable path ($\sigma(\theta)$).

In an embodiment the controller is configured to carry out the step of defining a cost function which comprises at least said approximation of the lag error and said approximation of the contour error, by defining the cost function as $$J_k = a_p c_p(p,\theta)$$

wherein $a_p \in$ [0 and $\infty$] is a weight parameter, and $c_p$ is defined as: $c_p(p,\theta) = \|E\|_{Q_p}$ with $E=[\epsilon_{76}, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error.

In an embodiment the controller is configured to carry out the step of defining a cost function which comprises at least said approximation of the lag error and said approximation of the contour error, by defining the cost function as $$J_k = a_p c_p(p,\theta) + a_{coll} c_{coll}$$

wherein $a_p \in$ [0 and $\infty$] is a weight parameter, and $c_p$ is defined as: $c_p(p,\theta) = \|E\|_{Q_p}$ with $E=[\epsilon_l, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error; wherein $a_{coll} \in$ [0 and $\infty$] is a weight factor and $$c_{coll} = \begin{cases} \|d_c\| & \text{if } d_c > 0 \\ 0 & \text{else} \end{cases}$$

wherein $d_c = \|r_{ct}\|_{\Omega_c} - 1$, $r_{ct} = t-p$ is a vector between geometric middle point of the drone and the geometric middle point of a subject which the drone is to avoid collision with; and $\Omega_c$ is a predefined region around said subject which the drone is not permitted to enter.

In an embodiment the controller is configured to carry out the step of defining a cost function which comprises at least said approximation of the lag error and said approximation of the contour error, by defining the cost function which further includes parameters:

$$a_{pv} c_{pv}$$

wherein $a_{pv} \in$ [0 and $\infty$] is a weight parameter, and $c_{pv} = v^T n - \eta$ wherein v is the velocity of the drone; $\eta$ is a predefined target velocity; n is a tangent to the virtual rail, wherein n is defined as $$n = \frac{s'}{\|s'\|} \text{ with } s' = \frac{\partial s(\theta)}{\partial \theta}.$$

In an embodiment said drone further comprises a camera mounted thereon which can be operated to capture images of a subject; and wherein the controller is configured to carry out the step of defining a cost function which comprises at least said approximation of the lag error and said approximation of the contour error, by defining the cost function as:

$$J_k = a_p c_p(p,\theta) + a_{coll} c_{coll} + a_i c_i$$

wherein $a_p \in$ [0 and $\infty$] is a weight parameter, and $c_p$ is defined as: $c_p(p,\theta) = \|E\|_{Q_p}$ with $E=[\epsilon_l, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error; wherein $a_{coll} \in$ [0 and $\infty$] is a weight factor and $$c_{coll} = \begin{cases} \|d_c\| & \text{if } d_c > 0 \\ 0 & \text{else} \end{cases}$$

wherein $d_c = \|r_{ct}\|_{\Omega_c} - 1$, $r_{ct} = t-p$ is a vector between geometric middle point of the drone and the geometric middle point of said subject; and $\Omega_c$ is a predefined region around said subject which the drone is not permitted to enter; wherein $a_i \in [0$ and $\infty]$ is a weight parameter; and $$c_i = \|\epsilon_m\|_Q$$

wherein $\epsilon_m = \dfrac{r_c}{\|r_c\|} - \dfrac{r_d}{\|r_d\|}$ wherein $r_c = R(p - l)$, wherein R is a rotation matrix (well known in the art) which describes the rotation from the live scene to a camera frame of said camera; p is the position of the drone; l is the position of said subject; $r_d$ is then a vector pointing from a centre of the camera to a desired projection of the subject position on the image plane; $r_d = [m_d, 1]^T$ wherein $m_d$ the intersection of a ray $m_d = [(\mu_x - C_x) f_x, (\mu_y - C_y) f_y]^T$ wherein $\mu_x, \mu_y$ are coordinates representing the position of pixels in a pixel array of the camera which are to receive light which is reflected from the subject, and wherein $C_x, C_y$ are coordinates representing the position of focal point and $f_x, f_y$ the focal length of the camera in the camera coordinate Frame.

In one embodiment the cost function defined by the controller further comprises the parameters:

$$a_d c_d$$

wherein $$c_d = \|\|l - p\|_2 - \sigma_d\|_{Q_d}$$

And wherein $\sigma_d$ is a predefined distanced from said subject which the camera is to remain; and wherein $a_d \in [0$ and $\infty]$ is a weight parameter.

In an embodiment the controller is configured to carry out the step of defining a cost function which comprises at least said approximation of the lag error and said approximation of the contour error, by defining the cost function which further includes parameters:

$$a_c c_c$$

wherein $a_c \in [0$ and $\infty]$ is a weight parameter; and wherein $$c_c = \begin{cases} \|d_d\| & \text{if } d_d > 0 \\ 0 & \text{else} \end{cases}$$

wherein $d_d = \|r_{ij}\|_{\Omega_c} - 1$, $r_{ij} = p_i - p$ is the vector between the position of the drone p and the position $p_i$ of another drone i; and $\Omega_d$ is a predefined region around said other drone i which the drone is not permitted to enter.

In an embodiment a plurality of drones each having a camera mounted thereon is provided, and wherein the controller is configured to carry out the step of defining a cost function which comprises at least said approximation of the lag error and said approximation of the contour error, by defining the cost function which further includes the parameters:

$$a_v c_v$$

wherein $a_v \in [0$ and $\infty]$ is a weight parameter; and wherein $$c_v = \begin{cases} Q_v d_{surf}^2 & \text{if } d_{surf} < 0 \\ 0 & \text{otherwise} \end{cases}$$

wherein $$d_{surf} = \|r_{ij} - p_{int}^T r_{view}\| - r_{cone}$$

-continued

With $$r_{cone} = \dfrac{\max(c_x, c_y)}{\max(f_x, f_y)} c_{int},$$

$c_{int} = r_{ij}^T r_{view}$, $p_{int} = c_{int} r_{view}$, $r_{ij} = p_i - p$ and $Q_v$ is a weight, Wherein if $d_{surf} > 0$ then a drone j is outside of the field of view of the camera of another drone i, and if $d_{surf} < 0$, then the drone j is present in the field of view of the camera of said other drone i.

In an embodiment the controller is configured to receive one or more predefining constraints, and wherein the controller is configured to respect said one or more predefined constraints when minimizing the cost function.

Said one or more constraints may comprise: one or more of constraints on the state of the drone, wherein said state of the drone may comprise the position which the drone occupies and/or the speed of the drone; constraints on the control input; constraints on the distance which the drone can travel; a constraint that the drone must avoid collision with a subject; a constraint that the drone must avoid collision with a another drone.

In an embodiment the controller is further configured to determine an allowable flying zone along a virtual rail, using one or more predefined radius values, wherein the step of defining a cost function which comprises at least said approximation of the lag error and said approximation of the contour error comprises, defining the cost function as:

$$J_k = a_p c_p(p, \theta) + c_t$$

and wherein $$e_s = \|r_{ps} - (r^T z_n) z_n\|_2$$

$$e_b = \|r_{ps} - (r^T x) x_n\|_2$$

wherein $$z_n = \dfrac{z_t}{\|z_t\|}$$

where $z_t = x_n \times n$, $$x_n = \dfrac{b_n}{\|b_n\|},$$

$$b_n = n \times z_g$$

and $z_g = [0,0,1]^T$ is a vector along the direction of gravity, and $r_{ps}$ is a relative vector between the virtual rail and the position of the drone, defined as $r_{ps} := s(\theta) - p$; wherein p is the position of the drone; wherein $s(\theta)$ is a function representing the virtual rail; $s(\theta^*)$ is the point along the virtual rail which is closest to the drone; n is a tangent to the virtual rail, wherein n is defined as $$n = \dfrac{s(\theta)'}{\|s(\theta)'\|} \text{ with } s(\theta') = \dfrac{\partial s(\theta)}{\partial \theta},$$

and wherein $$d_{tube} = \left( \dfrac{e_s^2}{a_s^2} + \dfrac{e_b^2}{a_b^2} \right)^{\frac{1}{2}}$$

-continued wherein $$c_t = \begin{cases} a_t d_{tube} & \text{if } d_{tube} > 0 \\ 0 & \text{otherwise} \end{cases}$$

and $a_t \in [0 \text{ and } \infty]$ is a weight factor; and wherein $a_s(\theta)$ and $a_b(\theta)$ are each radii functions.

In an embodiment the controller is further configured to determine an allowable flying zone along an $n^{th}$ order tailor approximation of a virtual rail, using one or more predefined radius values, wherein the step of defining a cost function which comprises at least said approximation of the lag error and said approximation of the contour error comprises, defining the cost function as:

$$J_k = a_p c_p(p, \theta) + c_t$$

and wherein $$e_s = \|r_{ps} - (r^T z_n)z_n\|_2$$

$$e_b = \|r_{ps} - (r^T x)x_n\|_2$$

wherein $$z_n = \frac{z_t}{\|z_t\|}$$

where $z_t = x_n \times n$, $$x_n = \frac{b_n}{\|b_n\|},$$

$$b_n = n \times z_g$$

and $z_g = [0,0,1]^T$ is a vector along the direction of gravity, and $r_{ps}$ is a relative vector between the virtual rail and the position of the drone, defined as $r_{ps} := s(\theta) - p$; wherein p is the position of the drone; wherein $s(\theta)$ is a function representing the virtual rail; $s(\theta)$ is the point along the virtual rail which is closest to the drone; n is a tangent to the virtual rail, wherein n is defined as $$n = \frac{s(\theta)'}{\|s(\theta)'\|} \text{ with } s(\theta)' = \frac{\partial s(\theta)}{\partial \theta},$$

and wherein $$d_{tube} = \left(\frac{e_s^2}{a_s^2} + \frac{e_b^2}{a_b^2}\right)^{\frac{1}{2}}$$

wherein $$c_t = \begin{cases} a_t d_{tube} & \text{if } d_{tube} > 0 \\ 0 & \text{otherwise} \end{cases}$$

and $a_t \in [0 \text{ and } \infty]$ is a weight factor; and wherein $a_s(\theta)$ and $a_b(\theta)$ are each radii functions.

It should be understood that the cost function may include any one or more of said above mentioned parameters, $a_{coll}c_{coll}$, $a_{pv}c_{pv}$, $a_ic_i$, $a_dc_d$, $a_cc_c$, $a_vc_v$, $c_t$. It should be understood that, if included in the cost function, any one or more of said above mentioned parameters, $a_{coll}c_{coll}$, $a_{pv}c_{pv}$, $a_ic_i$, $a_dc_d$, $a_cc_c$, $a_vc_v$, $c_t$ would be added to the other variables in the cost function. The cost function may include any combination of said parameters depending on the objectives which are to be fulfilled.

Also for all of the embodiments and functions described an $n^{th}$ order tailor approximation of the virtual rail ($\sigma(\theta)$) may be used in place of the virtual rail $s(\theta)$. In other words for all embodiments and functions the parameter $s(\theta)$ (representing the virtual rail) could be replaced with a the parameter ($\sigma(\theta)$) (representing the $n^{th}$ order tailor approximation of the virtual rail), so that the invention is implemented using an $n^{th}$ order tailor approximation everywhere in place of the virtual rail ($\sigma(\theta)$).

According to a further aspect of the present invention there is provided a method for controlling the flight of a drone which comprises one or more propellers and one or more actuators for actuating said one or more propellers to generate a thrust force which enables the drone to fly; a controller which is configured such that it can control the flight of the drone, wherein the controller comprises a memory having stored therein a plurality of predefined sets of positions which define a virtual rail which can be used to guide the flight of the drone so that the drone can avoid collision with an subject, and wherein the controller further comprises a mathematical model of the drone; the method comprising the steps of, (a) approximating a lag error based on the position of the drone measured by a sensor and the virtual rail, wherein the lag error is the distance between a point along the virtual rail which is closest to the drone and an estimate of said point along the virtual rail which is closest to the drone;

(b) approximating a contour error based on the position of the drone as measured by a sensor and the virtual rail, wherein the contour error is the distance between a point along the virtual rail which is closest to the drone and the position of the drone;

(c) defining a cost function which comprises at least said approximation of the lag error and said approximation of the contour error;

(d) minimizing the defined cost function, while also respecting at least limitations of the drone which are defined in said mathematical model, to determine a plurality of control inputs over a predefined time period into the future, and (e) applying the first control input only to the one or more actuators.

The method may further comprise any one or more of the steps which are carried out by the controller of any of the drone embodiments mentioned in this application.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
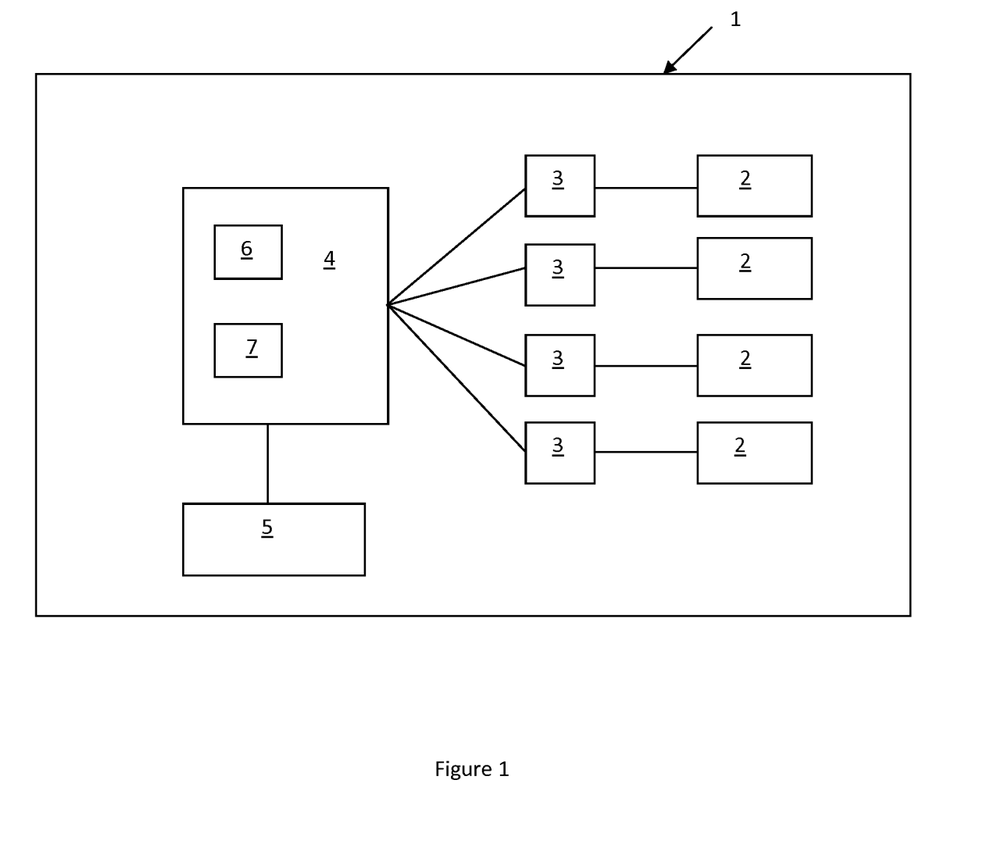
FIG. 1 is a schematic diagram illustrating the features of a drone according to an exemplary embodiment of the present invention.

According to the present invention there is provided a drone 1 comprising one or more propellers 2 and one or more actuators 3 for actuating said one or more propellers 2 to generate a thrust force which enables the drone 1 to fly.

In this embodiment the drone 1 further comprises a sensor 5 which can measure the state of the drone. In this embodiment the senor 5 is mounted on the drone; however it is not essential to the invention that the sensor 5 be mounted on the drone. For example, the sensor 5 maybe mechanically independent of the drone 1; in other words the sensor 5 which measures the state of the drone 1 maybe an external sensor which does not form part of the drone 1 or is remote to the drone 1; for example the senor 5 which measures the state of the drone may be mounted on another drone, or the sensor 5 may be a sensor 5 which is located on the ground. The state of the drone which the sensor 5 measures, comprises at least the position of the drone 1. Thus, in one example the sensor 5 is a position sensor which can measure the position of the drone 1. In another example the state of the drone comprises the position of the drone 1 and the velocity of the drone 1. Thus, in another example the sensor 5 is a position and velocity sensor which can measure both the position and velocity of the drone 1. The sensor 5 may take any suitable configuration; for example the sensor 5 may comprises any one or more of: a GPS module; any suitable motion tracking system known in the art; any suitable position estimation system based on onboard sensors know in the art (such as a camera, inertial measurement unit (IMU) etc.).

The drone 1 further comprises a controller 4 which is configured such that it can control the flight of the drone 1. The controller 4 comprises a memory 6 having stored therein a plurality of predefined sets of positions which define one or more virtual rails which can be used to guide the flight of the drone 1; preferably said predefined sets of positions which define one or more virtual rails which can be used to guide the flight of the drone 1 so that the drone 1 can avoid collision with a subject. In other words the virtual rail define a path which avoids collision with any subjects; accordingly if the drone follows the virtual rail the drone will avoid collision with any subjects. It should be understood that a subject may be any entity, for example the subject may be a person or thing, such as, for example, an object, a building, another drone, a car, bicycle or even a paraglider. Each position in a set of positions which define a virtual rail is preferably represented as a spatial coordinate.

The controller 4 further comprises a mathematical model 7 of the drone 1. This mathematical model 7 defines limitations of the drone 1, such as, for example, the maximum or minimum linear speed which the drone 1 can fly; the maximum and minimum speed of rotation which the drone 1 can fly; the maximum and/or minimum thrust force which can be generated by the propellers 2 of the drone 1. In the most preferred embodiment the controller 4 uses the mathematical model 7 to implement a model predictive control to control the flight of the drone 1.

Figure 2:
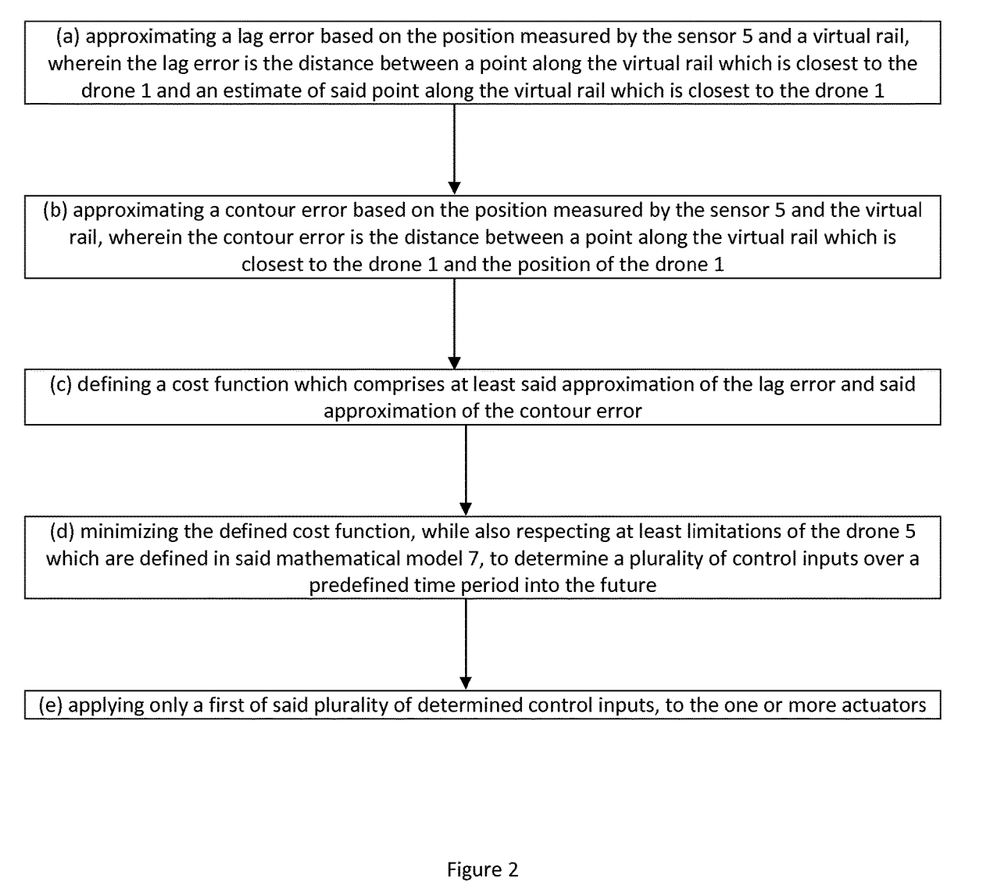
FIG. 2 is a flow chart which illustrates the steps taken by the controller of the drone shown in FIG. 1, in order to control the flight of said drone.

The series of steps which the controller 4 performs to control the flight of the drone 1 is illustrated in a flow chart in FIG. 2. Referring to FIG. 2, the controller 4 is configured to control the flight of the drone by performing at least the following steps, (a) approximating a lag error based on the position measured by the sensor 5 and a virtual rail, wherein the lag error is the distance between a point along the virtual rail which is closest to the drone 1 and an estimate of said point along the virtual rail which is closest to the drone 1;

(b) approximating a contour error based on the position measured by the sensor 5 and the virtual rail, wherein the contour error is the distance between a point along the virtual rail which is closest to the drone 1 and the position of the drone 1;

(c) defining a cost function which comprises at least said approximation of the lag error and said approximation of the contour error;

(d) minimizing the defined cost function, while also respecting at least limitations of the drone 5 which are defined in said mathematical model 7, to determine a plurality of control inputs over a predefined time period into the future, and (e) applying only a first of said plurality of determined control inputs, to the one or more actuators 3.

Thus, in this embodiment while a plurality of control inputs over a predefined time period into the future are determined, only one of those determined control inputs are applied. The remaining determined control inputs are not used. The above mentioned steps a-e are repeated a plurality of times, each time only the first of the determined plurality of control inputs is applied and the other remaining determined control inputs are not used.

It will be understood that the position of the drone 5 used in steps (a) and (b) is the position which is measured by the sensor 5. As already mentioned the sensor 5 may take any suitable configuration; for example the sensor 5 may be mounted on the drone 1, or may be remote to the drone 1.

It should also be understood that in some situations there will be a plurality of different points along the virtual rail all of which are the closest to the drone 1 (i.e. the plurality of the different points along the virtual rail will be equal distance to the drone 1); in such a case the controller 4 simply selects any one of said points which could be considered the closest to the drone. For example, if the virtual rail is a circle of constant radius around the drone 1, and the drone 1 is positioned in the centre of that circle, then in this case all of the points along the circular virtual rail could be considered the closest to the drone 1; in such a case the controller could selects any one of points along the circular virtual rail to be the closest to the drone 1.

In one embodiment the approximation of the lag error and the approximation of the contour error are determined with respect to the virtual rail directly. Specifically, the step of approximating a lag error comprises approximating a lag error ($\epsilon_l$) by, $$\epsilon_l(p,\theta) = \|r_{ps}^T n\|$$

wherein the superscript T means transposed; wherein p is the position of the drone (measured by the sensor 5); $\theta$ is a rail parameter representing a point along the virtual rail; $r_{ps}$ is a relative vector between the virtual rail and the position of the drone, defined as $r_{ps} := s(\theta) - p$; wherein p is the position of the drone as measured by the senor 5; wherein $s(\theta)$ is a function representing the virtual rail; $s(\theta^*)$ is the point along the virtual rail which is closest to the drone; n is a tangent to the virtual rail; and wherein n is defined as $$n = \frac{s(\theta)'}{\|s(\theta)'\|} \text{ with } s(\theta)' = \frac{\partial s(\theta)}{\partial \theta}.$$

and the step of approximating a contour error comprises approximating a contour error ($\epsilon_c$) by, $$\epsilon_c(p,\theta) = \|r_{os} - (r_{ps}^T n)n\|$$

wherein the superscript T means transposed; wherein p is the position of the drone (measured by the sensor 5), and $\theta$ is a rail parameter representing a point along the virtual rail; $r_{ps}$ is a relative vector between the virtual rail and the position of the drone, defined as $r_{ps} := s(\theta) - p$; wherein p is the position of the drone as measured by the senor 5; wherein $s(\theta)$ is a function representing the virtual rail; $s(\theta^*)$ is the point along the virtual rail which is closest to the drone: n is a tangent to the virtual rail, wherein n is defined as $$n = \frac{s'}{\|s'\|} \text{ with } s' = \frac{\partial s(\theta)}{\partial \theta}.$$

In another embodiment the approximation of the lag error and the approximation of the contour error are determined with respect to an $n^{th}$ order approximation of the virtual rail (such as for example a second order tailor approximation of the virtual rail). In this example a second order tailor approximation of the virtual rail is determined and the approximation of the lag error and the approximation of the contour error are determined with respect to an second order tailor approximation; however it will be understood that the present invention is not limited to using the second order tailor approximation of the virtual rail, indeed any $n^{th}$ order tailor approximation of the virtual rail may be determined and the approximation of the lag error and the approximation of the contour error are determined with respect to that $n^{th}$ order tailor approximation. In this exemplary embodiment the controller 4 is configured to, determine a second order tailor approximation of the virtual rail to provide a differentiable path $\sigma(\theta)$. In this embodiment in which the approximation of the lag error and the approximation of the contour error are determined with respect to second order tailor approximation of the virtual rail the step of approximating a lag error comprises approximating a lag error ($\epsilon_l$) by, $$\epsilon_l(p,\theta) = \|r_{ps}^T n\|$$

wherein the superscript T means transposed; wherein p is the position of the drone as measured by the sensor 5; wherein $\theta$ is a parameter representing a point along the second order tailor approximation of the virtual rail; $r_{ps}$ is a relative vector between the second order tailor approximation of the virtual rail and the position of the drone, defined as $r_{ps}:=\sigma(\theta)-p$; wherein p is the position of the drone as measured by the senor 5; wherein $\sigma(\theta)$ is a function representing the second order tailor approximation of the virtual rail; $\sigma(\theta^*)$ is a point along the second order tailor approximation of the virtual rail which is closest to the drone; and wherein n is the tangent to the second order tailor approximation of the virtual rail and is defined as $$n = \frac{\sigma(\theta)'}{\|\sigma(\theta)'\|} \text{ with } \sigma(\theta)' = \frac{\partial \sigma(\theta)}{\partial \theta}$$

and the step of approximating a contour error comprises approximating a contour error ($\epsilon_c$) by, $$\epsilon_c(p,\theta) = \|r_{p\sigma} - (r_{p\sigma}^T n)n\|$$

wherein the superscript T means transposed; wherein p is the position of the drone as measured by the sensor 5; wherein $\theta$ is a parameter representing a point along the second order tailor approximation of the virtual rail; $r_{ps}$ is a relative vector between the second order tailor approximation of the virtual rail and the position of the drone, defined as $r_{ps}:=\sigma(\theta)-p$; wherein p is the position of the drone as measured by the senor 5; wherein $\sigma(\theta)$ is a function representing the second order tailor approximation of the virtual rail; $\sigma(\theta^*)$ is a point along the second order tailor approximation of the virtual rail which is closest to the drone; and wherein n is the tangent to the the second order tailor approximation of the virtual rail and is defined as $$n = \frac{\sigma(\theta)'}{\|\sigma(\theta)'\|} \text{ with } \sigma(\theta)' = \frac{\partial \sigma(\theta)}{\partial \theta}$$

In one embodiment, the step of defining a cost function which comprises at least said approximation of the lag error and said approximation of the contour error comprises, defining the cost function as $$J_k = a_p c_p(p,\theta)$$

wherein $a_p \in [0 \text{ and } \infty]$ is a weight parameter (which can be selected by a user i.e. is tuneable), and $c_p$ is defined as: $c_p(p,\theta) = \|E\|_{Q_p}$ with $E = [\epsilon_l, \epsilon_c]^T$, wherein p is the position of the drone 1 as measured by the sensor 5; wherein $\epsilon_c$ is said approximation of the contour error, and $\epsilon_l$ is said approximation of the lag error (as previously described it is possible to determine the approximation of the contour error, and the approximation of the lag error with respect to the virtual rail directly or with respect to a nth order approximation of the virtual rail); wherein $\theta$ is a parameter which either, represents a point along the virtual rail if the approximations of the lag error and contour error are done with respect to the virtual rail directly, or represents a point along the $n^{th}$ order tailor approximation of the virtual rail if the approximations of the lag error and contour error are done with respect with respect to an $n^{th}$ order approximation of the virtual rail.

As mentioned the controller 4 minimizes the defined cost function, while also respecting the limitations of the drone which are defined in said mathematical model 7. In this example, when the controller 4 minimizes the above-mentioned cost function the resulting controller inputs, if applied to the actuators 3, will move the drone 1 to follow the virtual rail. Since the virtual rail defines a path which avoids collision with subjects of an a priori know position, by following the virtual rail the drone will avoid collision with those subjects.

The aforementioned cost function is the simplest form of the cost function which can be defined by the controller 4 in the present invention; it essentially contains only said approximation of the lag error and said approximation of the contour error. However, as will be described in more detail below, in other embodiments of the present invention, more complex cost functions (i.e. a cost function including parameters in addition to said approximation of the lag error and said approximation of the contour error) are also possible depending on predefined objectives which are to be achieved. Said predefined objectives maybe, for example, to avoid collision with a subject; and/or ensuring that light rays reflected by a subject which is being filmed using a camera are incident on predefined selection of pixels in the camera's pixel array so that the filmed subject will be displayed in a predefined position on a display screen. Thus, it should be understood that the cost function (which is minimized by the controller 4) will always comprise an approximation of the lag error and an approximation of the contour error, but may optionally include additional parameters which represent predefined objectives which are to be achieved. Regardless of what parameters are in the cost function which is defined by the controller 4, the cost function will be minimized to determine a plurality of control inputs over a predefined time period into the future, and then only the first of the plurality of determined control inputs is applied to the one or more actuators 3.

In one example a predefined objective to be fulfilled may be to follow the virtual rail at a predefined velocity $\eta$. Said predefined velocity $\eta$ may be set by a user or may be computed by a software algorithm. In this example case the controller 4 defines the cost function as:

$$J_k = a_p c_p(p,\theta) + a_{pv} c_{pv}$$

wherein $a_p \in [0$ and $\infty]$ is a weight parameter (which can be selected by a user i.e. is tuneable), and $c_p$ is defined as: $c_p(p,\theta) = \|E\|_{Q_p}$ with $E = [\epsilon_l, \epsilon_c]^T$, wherein p is the position of the drone 1 as measured by the sensor 5; wherein $\epsilon_c$ is said approximation of the contour error, and $\epsilon_l$ is said approximation of the lag error (the approximation of the contour error, and the approximation of the lag error being determined with respect to the virtual rail directly); wherein $\theta$ is a parameter which represents a point along the virtual rail; wherein $a_{pv} \in [0$ and $\infty]$ is a weight parameter (which can be selected by a user i.e. is tuneable), and $C_{pv} = v^T n - \eta$ wherein v is the velocity of the drone 1; $\eta$ is said predefined velocity; n is a tangent to the virtual rail wherein n is defined as $$n = \frac{s'}{\|s'\|} \text{ with } s' = \frac{\partial s(\theta)}{\partial \theta}.$$

It should be noted that the v the velocity of the drone 1 could be determined in any suitable way; for example the v the velocity of the drone 1 could be determined from the position of the drone 1 measured by the sensor 5 i.e. by determining the rate of change of the position; in another embodiment the sensor 5 is configured to measure both the position and velocity of the drone 1, thus the sensor 5 can measure velocity of the drone 1 directly.

In this example, when the controller 4 minimizes the above-mentioned cost function the resulting controller inputs, if applied to the actuators 3, will move the drone 1 to follow the virtual rail (thus avoiding collision with subjects) at a speed which is equal to (or substantially equal to) said predefined velocity v.

In another example a predefined objective to be fulfilled may be to follow the approximation of the virtual rail with a predefined velocity $\eta$. Said predefined velocity $\eta$ may be set by a user or may be computed by a software algorithm. In this example case the controller 4 defines the cost function as:

$$J_k = a_p c_p(p,\theta) + a_{pv} c_{pv}$$

wherein $a_p \in [0$ and $\infty]$ is a weight parameter (which can be selected by a user i.e. is tuneable), and $c_p$ is defined as: $c_p(p,\theta) = \|E\|_{Q_p}$ with $E = [\epsilon_l, \epsilon_c]^T$, wherein p is the position of the drone 1 as measured by the sensor 5; wherein $\epsilon_c$ is said approximation of the contour error, and $\epsilon_l$ is said approximation of the lag error (the approximation of the contour error, and the approximation of the lag error determined with respect to an $n^{th}$ order tailor approximation of the virtual rail); wherein $\theta$ is a parameter which either, represents a point along the $n^{th}$ order tailor approximation of the virtual rail;
wherein $a_{pv} \in [0$ and $\infty]$ is a weight parameter (which can be selected by a user i.e. is tuneable), and $c_{pv} = v^T n - \eta$ wherein v is the velocity of the drone 1; $\eta$ is said predefined velocity; n is a tangent to the $n^{th}$ order tailor approximation of the virtual rail (which in this exemplary embodiment is a second order tailor approximation of the virtual rail) and is defined as $$n = \frac{\sigma(\theta)'}{\|\sigma(\theta)'\|} \text{ with } \sigma(\theta)' = \frac{\partial \sigma(\theta)}{\partial \theta}$$

wherein $\sigma(\theta)$ is a function representing second order tailor approximation of the virtual rail.

In this example, when the controller 4 minimizes the above-mentioned cost function the resulting controller inputs, if applied to the actuators 3, will move the drone 1 to follow the approximation of the virtual rail (thus avoiding collision with subjects) at a speed which is equal to (or substantially equal to) said predefined velocity v.

In yet another example in addition to the objective to follow the virtual rail, a predefined objective to be fulfilled may be to avoid collision with a subject (which may be moving or stationary). In this example a region around the subject, which the drone is not permitted to enter, is predefined. This region may be predefined by a user. In this example the predefined region around the subject is an ellipsoidal region; however it will be understood that the predefined region may have any shape. In this case the controller defines the cost function as:

$$J_k = a_p c_p(p,\theta) + a_{coll} c_{coll}$$

wherein $a_p$ and $c_p$ have the same definition as given in any of the earlier described embodiments; wherein $a_{coll} \in [0$ and $\infty]$ is a weight factor and $$c_{coll} = \begin{cases} \|d_c\| & \text{if } d_c > 0 \\ 0 & \text{else} \end{cases}$$

wherein $d_c = \|r_{ct}\|_{\Omega_c} - 1$, $r_{ct} = \iota - p$ is a vector between geometric middle point of the drone and the geometric middle point of the subject; and $\Omega_c$ is the predefined region (in this example, the ellipsoidal region $\Omega_c$) around the subject which the drone is not permitted to enter.

In this embodiment when the controller minimizes the above-mentioned cost function the resulting controller inputs, if applied to the actuators 3, will move the drone 1 to follow the virtual rail (thus avoiding collision with subjects) without entering into said predefined region (in this example, the ellipsoidal region $\Omega_c$) around the subject.

In another embodiment the drone 1 further comprises a camera which mounted thereon. The camera may be operated as the drone 1 flies in order to film (i.e. capture images of) a subject. The subject which is being filmed may be stationary or moving.

In one exemplary embodiment, in addition to the objective to follow the virtual rail, the predefined objectives to be fulfilled may be to ensure that the subject (stationary or moving) which is being filmed appears at a predefined position, or predefined area, of a display screen which displays the images captured by the camera (i.e. that a predefined set of pixels on the display screen, display the image of the subject), plus ensuring to avoid collision with the subject which is being filmed. In one exemplary implementation, the predefined objective of ensuring that the subject (stationary or moving) which is being filmed appears at a predefined position, or predefined area, of a display screen which displays the images captured by the camera, is achieved indirectly: namely the predefined objective to be fulfilled is to ensure that the camera is positioned so that light rays which are reflected by the subject which is being filmed are incident on a predefined selection of pixels in a pixel array of the camera; said predefined selection of pixels in a pixel array of the camera may correspond to pixels on a display screen which displays the images captured by the camera, where it is desired that the image of the subject is to appear.

In this embodiment where the predefined objective to be fulfilled is to ensure that the subject which is being filmed appears at a predefined position, or predefined area, of a display screen which displays the images captured by the camera, plus ensuring to avoid collision with the subject which is being filmed, the controller defines the cost function as:

$$J_k = a_p c_p(p,\theta) + a_{coll} c_{coll} + a_i c_i$$

Wherein $a_p$ and $c_p$ and p and $\theta$ and $a_{coll}$ and $c_{coll}$ have the same definition as given above for the previously described embodiments; wherein $a_i \in [0$ and $\infty]$ is a weight parameter; and $$c_i = \|\epsilon_m\|_Q$$
$$\text{wherein } \epsilon_m = \frac{r_c}{\|r_c\|} - \frac{r_d}{\|r_d\|}$$
$$\text{wherein } r_c = R(p - l),$$

wherein R is a rotation matrix (well known in the art) which describes the rotation from the live scene to the camera frame; p is the position of the drone as measured by the senor 5; l is the position of the subject to be filmed;

It should be noted that there is defined a 3D orthogonal Camera coordinate system with its origin at O. This is also where the camera aperture is located. The three axes of the coordinate system are referred to as x, y, z. Axis z is pointing in the viewing direction of the camera and is referred to as the optical axis, principal axis, or principal ray. The 3D plane which intersects with axes x and y is the front side of the camera, or principal plane. An image plane is where the 3D world is projected through the aperture of the camera. The image plane is parallel to axes x and the y axis is located at distance $f$ (focal length) from the origin O in the positive direction of the z axis.

$r_d$ is then a vector pointing from the camera center O to desired projection of the subject position on the image plane in pixel units; $r_d = [m_d, 1]^T$ wherein $m_d$ the intersection of the ray $m_d = [(\mu_x - C_x)f_x, (\mu_y - C_y)f_y]^T$ wherein $\mu_x$, $\mu_y$ are coordinates representing the position of the pixels in the pixel array of the camera which are to receive light which is reflected from the subject which is being filmed, and wherein $C_x$, $C_y$ are coordinates representing the position of focal point and $f_x$, $f_y$ the focal length of the camera in the x and y direction of the camera coordinate Frame.

In this embodiment when the controller minimizes the above-mentioned cost function the resulting controller inputs, if applied to the actuators 3, will move the drone 1 to follow the virtual rail (thus avoiding collision with subjects), and will move the drone into a position where the camera which is mounted on the drone can capture images of the subject from a perspective and position which will ensure that the image of the subject will appear at the predefined position, or predefined area, of a display screen which displays the images captured by the camera, while also avoiding collision with the subject which is being filmed.

In a further variation of the previously mentioned embodiment, in addition to the objective to follow the virtual rail, the predefined objective to be fulfilled may be ensure that, the subject which is being filmed appears at a predefined position, or predefined area, of a display screen which displays the images captured by the camera (i.e. that a predefined set of pixels on the display screen, display the image of the subject), and, that the camera remains at a predefined distance from the subject being filmed, plus ensuring to avoid collision with the subject which is being filmed. In this case the controller defines the cost function as:

$$J_k = a_p c_p(p,\theta) + a_{coll} c_{coll} + a_i c_i + a_d c_d$$

Wherein $a_p$ and $c_p$ and p and $\theta$ and $a_{coll}$ and $c_{coll}$ and $c_i$ and $a_i$ have the same definition as given above for the previously described embodiments; and wherein $$c_d = \|\|\iota - p\|_2 - \sigma_d\|_{Q_d}$$

Wherein $\sigma_d$ is said predefined distanced from the subject being filmed which the camera is to remain; l is the position of the subject to be filmed; and wherein $a_d \in [0$ and $\infty]$ is a weight parameter and $Q_d \in [0$ and $\infty]$ is a weight parameter.

In this embodiment when the controller minimizes the above-mentioned cost function the resulting controller inputs, if applied to the actuators 3, will move the drone 1 to follow the virtual rail (thus avoiding collision with subjects), and will move the drone into a position where the camera which is mounted on the drone can capture images of the subject from a perspective and position which will ensure that the image of the subject will appear at the predefined position, or predefined area, of a display screen which displays the images captured by the camera, and that the camera remains at the predefined distance $\sigma_d$ from the subject being filmed, while also avoiding collision with the subject which is being filmed.

In yet another embodiment a subject is to be filmed by a plurality of drones according to the present invention each of said plurality of drones having a camera mounted thereon. In this example in addition to the objective to follow a respective virtual rail, each of the plurality of drones have the following predefined objectives to be fulfilled: to avoid collision with another one of the drones, plus to ensure that the subject which is being filmed appears at a predefined position, or predefined area, of a display screen which displays the images captured by the camera mounted on the drone (i.e. that a predefined set of pixels on the display screen, display the image of the subject), plus, that the camera is a predefined distance from the subject being filmed, plus ensuring to avoid collision with the subject which is being filmed.

In this embodiment, for each of the plurality of drones, a predefined region $\Omega_d$ around the drone is defined which another drone i is not permitted to enter. It will be understood that the predefined region $\Omega_d$ may be predefined by a user. In this example the predefined region $\Omega_d$ around the drone i is an ellipsoidal region; however it will be understood that the predefined region $\Omega_d$ may have any shape.

In this embodiment the controller defines the cost function as:

$$J_k = a_p c_p(p,\theta) + a_{coll} c_{coll} + a_i c_i + a_d c_d + a_c c_c$$

Wherein $a_p$ and $c_p$ and p and $\theta$ and $a_{coll}$ and $c_{coll}$ and $c_i$ and $a_i$ and $c_d$ and $a_d$ have the same definition as given above for the previously described embodiments; and wherein $a_c \in [0$ and $\infty]$ is a weight parameter; and wherein $$c_c = \begin{cases} \|d_d\| & \text{if } d_d > 0 \\ 0 & \text{else} \end{cases}$$

wherein $d_d=\|r_{ij}\|_{106_c}-1$, $r_{ij}=p_i-p$ is the vector between the position of the drone p and the position $p_i$ of another drone i; and $\Omega_d$ is said predefined region around said other drone i which the drone is not permitted to enter.

In this embodiment when the controller minimizes the above-mentioned cost function the resulting controller inputs, if applied to the actuators 3, will move the drone 1 to follow the virtual rail (thus avoiding collision with subjects), and will move the drone into a position where the camera which is mounted on the drone can capture images of the subject from a perspective and position which will ensure that the image of the subject will appear at the predefined position, or predefined area, of a display screen which displays the images captured by the camera, and that the camera remains at the predefined distance $\sigma_d$ from the subject being filmed, while also avoiding collision with the subject which is being filmed, and also avoiding collision with any of the other drones.

It should be understood that in this embodiment (and preferably in all embodiments described in this application), when the controller 4 minimizes the cost function this results in both control inputs over a predefined time period (i.e. time window) into the future (e.g a 2 second time window into the future) and also predicted states (i.e. positions and/or speeds) which the drone is expected to have over that predefined period into the future. The predicted states includes at least predicted positions of the done and/or in another embodiment the predicted states include both the predicted position and predicted velocity of the drone. The predicted states result due to the model predictive control algorithm which is used by the controller. The controller inputs and the predicted states which result from minimizing the cost function define a plan for that respective drone. In this particular embodiment, the controller 4 of each of respective drone is configured to communicate its respective plan to the controllers 4 of each of the other of said plurality of drones; thus each of the drones receive the plans of each of the other plurality of drones. Upon receiving the plans of all of the other drones, each respective controller 4 determines a collision free trajectory for the drone to follow, based on the plans of other drones (i.e. based on the predicted positions the other drones are expected to occupy in time window). This is repeated on every iteration and the time window is also shifted one time-step ahead. Further, to further improve safety, each of the controllers 4 of each of the plurality of drone may be configured to determine, sequentially, a respective collision free trajectory, and the determined collision free trajectory may be communicated to the controllers of each of the other drones. While in the first iteration this is equivalent to priority planning, in the subsequent iterations it is not and leads to more cooperative trajectories.

In yet another embodiment a subject is to be filmed by a plurality of drones according to the present invention each of said plurality of drones having a camera mounted thereon. In this example in addition to the objective to follow a respective virtual rail, each of the plurality of drones have the following predefined objectives to be fulfilled: to avoid collision with another one of the drones, plus to ensure that the subject which is being filmed appears at a predefined position, or predefined area, of a display screen which displays the images captured by the camera mounted on the drone (i.e. that a predefined set of pixels on the display screen, display the image of the subject), plus, that the camera is a predefined distance from the subject being filmed, plus ensuring to avoid collision with the subject which is being filmed, plus that none of the drones enter into the field of view of camera of another drone (i.e. mutual visibility). In this embodiment the controller 4 defines the cost function as:

$$J_k = a_p c_p(p,\theta) + a_i c_i + a_d c_d + a_c c_c + a_v c_v$$

Wherein $a_p$ and $c_p$ and p and $\theta$ and $a_{coll}$ and $c_{coll}$ and $c_i$ and $a_i$ and $c_d$ and $a_d$ and $c_c$ and $a_c$ have the same definition as given above for the previously described embodiments; and wherein $a_v \in [0$ and $\infty]$ is a weight parameter; and wherein $$c_v = \begin{cases} Q_v d_{surf}^2 & \text{if } d_{surf} < 0 \\ 0 & \text{otherwise} \end{cases}$$

wherein $$d_{surf} = \|r_{ij} - p_{int}^T r_{view}\| - r_{cone}$$

With $$r_{cone} = \frac{\max(c_x, c_y)}{\max(f_x, f_y)} c_{int},$$

$c_{int}=r_{ij}^T r_{view}$, $p_{int}=c_{int} r_{view}$, $r_{ij}=p_i-p$ and $Q_v$ is a weight, Wherein if $d_{surf}>0$ then drone j is outside of the field of view of the camera of said other drone i, and if $d_{surf}<0$, then drone j is present in the field of view of the camera of said other drone i.

In this embodiment when the controller minimizes the above-mentioned cost function the resulting controller inputs, if applied to the actuators 3, will move the drone 1 to follow the virtual rail (thus avoiding collision with subjects), and will move the drone into a position where the camera which is mounted on the drone can capture images of the subject from a perspective and position which will ensure that the image of the subject will appear at the predefined position, or predefined area, of a display screen which displays the images captured by the camera, and that the camera remains at the predefined distance $\sigma_d$ from the subject being filmed, while also avoiding collision with the subject which is being filmed, and also avoiding collision with any of the other drones, and wherein none of the drones will appear in the images captured by the camera of the respective drone.

In another embodiment the position which the drone is allowed to occupy is made part of the cost function; for example an allowable flying zone which extends along the virtual rail is predefined (for example the allowable flying zone which extends along the virtual rail may be defined by a user before the drone flies; or in yet another embodiment the allowable flying zone which extends along the virtual rail may be defined as the drone flies e.g. by an algorithm); as the drone follows the virtual rail it may occupy positions within the predefined allowable flying zone only, but cannot move to positions outside of the predefined allowable flying zone. In this embodiment the controller may be further configured to receive one or more predefined radius values, and to determine an allowable flying zone along a virtual rail (or along an $n^{th}$ order approximation of the virtual rail) using said received one or more predefined radius values. In this example in addition to the objective to follow a respective virtual rail, an objective for the drone to remain within the allowable flying zone is to be fulfilled. In this embodiment the controller 4 defines the cost function as:

$$J_k = a_p c_p(p, \theta) + c_t$$

and wherein $$e_s = \|r_{ps} - (r^T z_n) z_n\|_2$$

$$e_b = \|r_{ps} - (r^T x) x_n\|_2$$

With $$z_n = \frac{z_t}{\|z_t\|} \text{ where } z_t = x_n \times n, \; x_n = \frac{b_n}{\|b_n\|}, \; b_n = n \times z_g$$

and $z_g = [0,0,1]^T$ is a vector which is aligned with the earth z e.g. gravity direction and $r_{ps}$ is a relative vector between the virtual rail and the position of the drone, defined as $r_{ps} := s(\theta) - p$; wherein p is the position of the drone as measured by the senor 5; wherein $s(\theta)$ is a function representing the virtual rail; $s(\theta^*)$ is the point along the virtual rail which is closest to the drone; n is a tangent to the virtual rail, wherein n is defined as $$n = \frac{s(\theta)'}{\|s(\theta)'\|} \text{ with } s(\theta)' = \frac{\partial s(\theta)}{\partial \theta}.$$

$$d_{tube} = \left(\frac{e_s^2}{a_s^2} + \frac{e_b^2}{a_b^2}\right)^{\frac{1}{2}}$$

$$c_t = \begin{cases} a_t d_{tube} & \text{if } d_{tube} > 0 \\ 0 & \text{otherwise} \end{cases}$$

And $a_t \in [0 \text{ and } \infty]$ a weight factor. The two radii function of ellipse, where one is along a first axis $z_n$ and the other along a second axis $x_n$ direction, wherein a first axis $z_n$ and second axis $x_n$ are orthogonal, indicated with $a_s(\theta)$ and $a_b(\theta)$ respectively. Thus, for every point on the virtual rail a first radius in a direction along the first axis and a second radius in a direction along the second axis, can be defined; these radii can define a tube. The radii at different points along the virtual rail can differ, so that the defined tube will have a changing radius along the virtual rail.

When the controller minimizes the above mentioned cost function, the resulting controller inputs, if applied to the actuators, will move the drone 1 to follow the virtual rail (thus avoiding collision with subjects) while ensuring that the drone does not move outside of the predefined allowable flying zone.

In yet another embodiment the position which the drone is allowed to occupy is made part of the cost function; for example an allowable flying zone which extends along the second order approximation of the virtual rail is predefined (for example the allowable flying zone which extends along the second order approximation of the virtual rail may be defined by a user before the drone flies); as the drone follows the second order approximation of the virtual rail it may occupy positions within the predefined allowable flying zone only, but cannot move to positions outside of the predefined allowable flying zone. In this embodiment the controller 4 defines the cost function as.

$$J_k = a_p c_p(p, \theta) + c_t$$

wherein, $$e_s = \|r_{ps} - (r^T z_n) z_n\|_2$$

$$e_b = \|r_{ps} - (r^T x) x_n\|_2$$

wherein, $$z_n = \frac{z_t}{\|z_t\|}$$

where $z_t = x_n \times n$, $$x_n = \frac{b_n}{\|b_n\|},$$

$$b_n = n \times z_g$$

and $z_g = [0,0,1]^T$ a vector which is aligned with the earth z e.g. gravity direction and $r_{ps}$ is a relative vector between the second order approximation of the virtual rail and the position of the drone, defined as $r_{ps} := \sigma(\theta) - p$; wherein p is the position of the drone as measured by the senor 5; wherein $\sigma(\theta)$ is a function representing the second order approximation of the virtual rail; n is a tangent to the second order approximation of the virtual rail, wherein n is defined as $$n = \frac{\sigma'}{\|s'\|} \text{ with } s' = \frac{\partial \sigma(\theta)}{\partial \theta}.$$

$$d_{tube} = \left(\frac{e_s^2}{a_s^2} + \frac{e_b^2}{a_b^2}\right)^{\frac{1}{2}}$$

$$c_t = \begin{cases} a_t d_{tube} & \text{if } d_{tube} > 0 \\ 0 & \text{othewise} \end{cases}$$

And $a_t \in [0 \text{ and } \infty]$ a weight factor.

As mentioned the controller 4 is configured to carry out a step of minimizing the defined cost function, while also respecting at least limitations of the drone 1 which are defined in said mathematical model 7, to determine a plurality of control inputs over a predefined time period into the future. In a further embodiment the controller 4 is configured to minimize the defined cost function, while respecting limitations of the drone which are defined in said mathematical model 7 and also fulfilling one or more constraints (as is well known in standard optimization problems), to determine a plurality of control inputs over said predefined time period into the future. These one or more constraints may be hard constraints in which case they cannot be violated and must be fulfilled, or, maybe soft constraints in which case they can be violated to some degree. Hard constraints are turned into soft constraints using an additional slack variable. It should be understood that the constraints may be equality constraints or may be inequality constraints. In the present invention the limitations of the drone which are defined in said mathematical model 7 could be considered to be a constraint in the sense that the limitations of the drone which are defined in said mathematical model 7 must be fulfilled when minimizing the cost function; however, as will be described below additional constraints (i.e. in addition to the limitations of the drone which are defined in said mathematical model 7) could also be applied, when minimizing the cost function.

It should be understood that the one or more constraints may take any suitable form; typically the one or more constraints are dependent on desired objectives to be achieved (such as avoiding collision with a subject; or restricting the positions which the drone can occupy). For example, the constraints may comprise any one or more of: constraints on the state of the drone, in other words the done is not permitted to have certain states (e.g. the drone is not permitted to fly above a predefined speed, and/or the drone is not permitted to fly below a predefined speed, and/or the drone is not permitted to move out of a predefined region, and/or the drone is not permitted to move to a predefined position; constraints on the control inputs, such as constraints on the control inputs which can be applied to the actuators (e.g. the control inputs may not exceed a predefined voltage); constraints on the distance which the drone can travel (this constraint may be dictated by the capacity of the power source which powers the actuators of the drone, such as the capacity of a battery which powers the actuators of the drone); constraints with respect to the environment (e.g. that the drone z position (height) must be >=0, thus ensuring that done does not fly underground; the requirement for avoidance of collision with a subject may also form a constraint, such as avoidance of collision with a subject which is to be filmed by a camera mounted on the drone, or avoidance of collision with another drone, may define constraints which must be respected when minimizing the cost function.

In on embodiment in which avoidance of collision with a subject is a constraint which is to be respected when minimizing the cost function, a region around the subject, which the drone is not permitted to enter, is predefined. This region may be predefined by a user. In this example the predefined region around the subject is an ellipsoidal region; however it will be understood that the predefined region may have any shape. The constraint is provided as:

$$c_{coll}$$

wherein $$c_{coll} = \begin{cases} \|d_c\| & \text{if } d_c > 0 - \lambda \\ 0 & \text{else} \end{cases}$$

wherein $d_c = \|r_{ct}\|_{\Omega_c} - 1$, $r_{ct} = \iota - p$ is a vector between geometric middle point of the drone and the geometric middle point of the subject; and $\Omega_c$ is the predefined region (in this example, the ellipsoidal region $\Omega_c$) around the subject which the drone is not permitted to enter and $\lambda$ is a slack variable. It should be understood that the use of the slack variable in optional; the slack variable may be used to set the constraint as a hard constraint or a soft constraint; when the slack variable is applied to a constraint then it makes that constraint a soft constraint; when no slack variable is applied to a constraint then that constraint is a hard constraint.

In another embodiment in which there is a plurality of drones according to the present invention flying simultaneously, avoidance of collision with another drone may be set as a constraint. For example, in a case where there are a plurality of drones according to the present invention, each of said plurality of drones having a camera mounted thereon, and said plurality of drones are flown simultaneously to film a subject, collision avoidance between the drones can be formulized as a constraint. In this embodiment, for each of the plurality of drones, a predefined region $\Omega_d$ around the drone is defined which another drone i is not permitted to enter. It will be understood that the predefined region $\Omega_d$ may be predefined by a user. In this example the predefined region $\Omega_d$ around the drone i is an ellipsoidal region; however it will be understood that the predefined region $\Omega_d$ may have any shape. The constraint is provided as:

$$c_c$$

wherein $$c_c = \begin{cases} \|d_d\| & \text{if } d_d > 0 - \lambda \\ 0 & \text{else} \end{cases}$$

wherein $d_d = \|r_{ij}\|_{\Omega_c} - 1$, $r_{ij} = p_i - p$ is the vector between the position of the drone p and the position $p_i$ of another drone i, and $\Omega_d$ is the predefined region around the other drone i which the drone is not permitted to enter.

In yet a further embodiment hard constraints applied to the cost function may be relaxed using a slack variables $\lambda$ wherein:

$$\lambda \leq 0$$

In yet a further embodiment the following cost term $c_\lambda$ may be included in any of the above-mentioned cost functions $J_k$ (i.e. the cost term $c_\lambda$ may be added to the other variables mentioned in any of the above-mentioned cost functions $J_k$) wherein the cost term $C_\lambda$:

$$c_\lambda = a_\lambda \|\lambda\|_\infty$$

Under sufficiently high penalization using $a_\lambda$ of the cost term $c_\lambda$, the solution of the hard constraint problem, i.e. $\lambda=0$ is recovered. Otherwise, a plan (i.e. control inputs and states of the drone, determined by minimizing the cost function) with minimum deviation will be computed by the controller 4 (i.e. the optimizer) [E. C. Kerrigan and J. M. Maciejowski, "Soft constraints and exact penalty functions in model predictive control," in Control 2000 Conference, Cambridge, 2000].

In this case the controller defines the cost function as:

$$J_k = a_p c_p(p,\theta) + a_\lambda \|\lambda\|_\infty$$

Wherein $a_p$ and $c_p$ and p and $\theta$ have the same definition as given above for the previously described embodiments; wherein $\lambda$ is a slack variable and wherein $a_\lambda \in [0$ and $\infty]$ a weight factor typically 3-4 orders of magnitude higher penalization then for the remaining costs In one embodiment the controller is further configured to receive one or more predefined radius values, and to determine an allowable flying zone along a virtual rail using said received one or more predefined radius values. The allowable flying zone may then define a constraint which must be respected when minimizing the cost function; in other words the controller minimizes the defined cost function in a manner in which the constraint is fulfilled.

In one embodiment a constraint on the positions which the drone is allowed to occupy is applied when minimizing the cost function. In other words an allowable flying region, which extends along the virtual rail, which the drone is not permitted to move outside of, is predefined; and when the controller 4 is minimizing the cost function this constraint is respected so that the resulting control inputs will not move the drone to a position outside of the allowable flying region. As a result of this constraints, when the controller minimizes the cost function while fulfilling this constraint, the resulting controller inputs, if applied to the actuators, will not move the drone out of the allowable flying zone. In this embodiment the controller 4 defines the cost function as.

$$J_k = a_p c_p(p, \theta) + c_t$$

wherein $$e_s = \|r_{ps} - (r^T z_n) z_n\|_2$$
$$e_b = \|r_{ps} - (r^T x_n) x_n\|_2$$

wherein $$z_n = \frac{z_t}{\|z_t\|}$$

where $z_t = x_n \times n$, $$x_n = \frac{b_n}{\|b_n\|},$$
$$b_n = n \times z_g$$

and $z_g=[0,0,1]^T$ a vector which is alighed with the earth z e.g. gravity direction and $r_{ps}$ is a relative vector between the virtual rail and the position of the drone, defined as $r_{ps}$:=s(θ)−p; wherein p is the position of the drone as measured by the senor 5; wherein s(θ) is a function representing the virtual rail; s(θ*) is the point along the virtual rail which is closest to the drone; n is a tangent to the virtual rail, wherein n is defined as $$n = \frac{s'}{\|s'\|} \text{ with } s' = \frac{\partial s(\theta)}{\partial \theta}$$

wherein, $$d_{tube} = \left(\frac{e_s^2}{a_s^2} + \frac{e_b^2}{a_b^2}\right)^{\frac{1}{2}}$$

$$c_t = \begin{cases} a_t d_{tube} & \text{if } d_{tube} > 0 - \lambda \\ 0 & \text{otherwise} \end{cases}$$

And $a_t \in [0 \text{ and } \infty]$ a weight factor and λ is a slack variable to turn the hard- into a soft-constrain.

In another embodiment an allowable flying region, which extends along the $n^{th}$ order tailor approximation of the virtual rail (in this example the second order tailor approximation of the virtual rail), which the drone is not permitted to move outside of, is predefined; and when the controller 4 is minimizing the cost function this constraint is respected so that the resulting control inputs will not move the drone to a position outside of the allowable flying region. As a result of this constraints, when the controller minimizes the cost function while fulfilling this constraint, the resulting controller inputs, if applied to the actuators, will not move the drone out of the allowable flying zone. In this embodiment the controller 4 defines the cost function as.

$$J_k = a_p c_p(p, \theta) + c_t$$

wherein $$e_s = \|r_{ps} - (r^T z_n) z_n\|_2$$
$$e_b = \|r_{ps} - (r^T x_n) x_n\|_2$$

-continued wherein $$z_n = \frac{z_t}{\|z_t\|}$$

where $z_t = x_n \times n$, $$x_n = \frac{b_n}{\|b_n\|},$$
$$b_n = n \times z_g$$

and $z_g=[0,0,1]^T$ a vector which is alighed with the earth z e.g. gravity direction and $r_{ps}$ is a relative vector between the virtual rail and the position of the drone, defined as $r_{ps}$:=σ(θ)−p; wherein p is the position of the drone as measured by the senor 5; wherein σ(θ) is a function representing the virtual rail; n is a tangent to the approximation of the virtual rail, wherein n is defined as $$n = \frac{\sigma'}{\|\sigma'\|} \text{ with } s' = \frac{\partial \sigma(\theta)}{\partial \theta}.$$

$$d_{tube} = \left(\frac{e_s^2}{a_s^2} + \frac{e_b^2}{a_b^2}\right)^{\frac{1}{2}}$$

$$c_t = \begin{cases} a_t d_{tube} & \text{if } d_{tube} > 0 - \lambda \\ 0 & \text{otherwise} \end{cases}$$

And $a_t \in [0 \text{ and } \infty]$ a weight factor and λ is a slack variable to turn the hard- into a soft-constrain.

In yet a further embodiment of the invention, the controller 4 is further configured to modify the virtual rails (i.e. to modify the predefined sets of positions/coordinates which are stored in the memory 6). In order to do this the controller the points of the rail s(θ) can be time variant.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

For example in all of the embodiments and functions described above an $n^{th}$ order tailor approximation of the virtual rail (σ(θ)) may be used in place of the virtual rail s(θ). In other words for all embodiments and functions the parameter s(θ) (representing the virtual rail) could be replaced with a the parameter (σ(θ)) (representing the $n^{th}$ order tailor approximation of the virtual rail), so that the invention is implemented using an $n^{th}$ order tailor approximation everywhere in place of the virtual rail (σ(θ)); for example the n could alternatively be a tangent to the $n^{th}$ order tailor approximation of the virtual rail (σ(θ)) instead of being a tangent to the virtual rail virtual rail s(θ), wherein n is defined as $$n = \frac{\sigma'}{\|\sigma'\|} \text{ with } s' = \frac{\partial \sigma(\theta)}{\partial \theta}$$

instead of being defined as $$n = \frac{s'}{\|s'\|} \text{ with } s' = \frac{\partial s(\theta)}{\partial \theta}.$$

Different examples of cost functions with different predefined objectives (e.g. to follow the virtual rail at a predefined velocity v; to avoid collision with a subject being filmed etc.) are described in this description; importantly it should be understood that the present invention is not limited to the specific cost function examples which are mentioned in this description, the controller 4 may defined cost functions having any combination of the different parameters (which represent objectives to be fulfilled) which are mentioned in the cost function examples provided in this description. Likewise for the constrains, the controller 4 may be required to minimize any cost function respecting any combination of the one or more exemplary constraints provided in this description. Thus, it should be understood that the controller 4 may define a cost function having any combination of the parameters (representing any combination of different predefined objectives which are to be fulfilled) mentioned in the various exemplary cost functions outlined in this description; and the controller 4 may minimize the cost functions respecting any combination of the exemplary constraints mentioned in this description.

It should also be understood that the drone of the present invention may be used in any suitable application. While the description describes applications in which the drone of the present invention is used to capture images of a subject, the invention is not limited to such applications. For example the drone may be used to deliver packages; since the virtual rails are used to guide the flight of the drone the packages can be delivered with reduced risk of collision with a subject. Further collision avoidance parameters may be added to the cost function to reduce even further the risk of the drone colliding with a subject when delivering packages. Additionally or alternatively, a constraint which is to be respected when the controller is minimizing the cost function, which require collision avoidance, may be further provided to reduce even further the risk of the drone colliding with a subject when delivering packages.

The invention claimed is:

1. A drone comprising one or more propellers and one or more actuators for actuating said one or more propellers to generating a thrust force which enables the drone to fly;
   a controller which is configured such that it can control the flight of the drone,
   wherein the controller comprises a memory having stored therein a plurality of predefined sets of positions which define a virtual rail which can be used to guide the flight of the drone so that the drone can avoid collision with an subject; and
   wherein the controller further comprises a mathematical model of the drone;
   wherein the controller is configured to control the flight of the drone by performing at least the following steps,
   (a) approximating a lag error based on the position of the drone measured by a sensor and the virtual rail, wherein the lag error is the distance between a point along the virtual rail which is closest to the drone and an estimate of said point along the virtual rail which is closest to the drone;
   (b) approximating a contour error based on the position of the drone as measured by a sensor and the virtual rail, wherein the contour error is the distance between a point along the virtual rail which is closest to the drone and the position of the drone;
   (c) defining a cost function which comprises at least said approximation of the lag error and said approximation of the contour error;
   (d) minimizing the defined cost function, while also respecting at least limitations of the drone which are defined in said mathematical model, to determine a plurality of control inputs over a predefined time period into the future, and
   (e) applying the first control input only to the one or more actuators.

2. The drone according to claim 1, wherein the controller is configured to approximate the lag error ($\epsilon_L$) by, $$\epsilon_L(p,\theta) = \|r_{ps}^T n\|$$

wherein p is the position of the drone; θ is a rail parameter representing a point along the virtual rail; $r_{ps}$ is a relative vector between the virtual rail and the position of the drone, defined as $r_{ps} := s(\theta) - p$; wherein p is the position of the drone; wherein s(θ) is a function representing the virtual rail; s(θ*) is the point along the virtual rail which is closest to the drone; n is a tangent to the virtual rail; and wherein n is defined as $$n = \frac{s'}{\|s'\|} \text{ with } s' = \frac{\partial s(\theta)}{\partial \theta};$$

and the controller is configured to approximate the contour error ($\epsilon_c$) by, $$\epsilon_c(p,\theta) = \|r_{os} - (r_{ps}^T n)n\|$$

wherein p is the position of the drone; θ is a rail parameter representing a point along the virtual rail: $r_{ps}$ is a relative vector between the virtual rail and the position of the drone, defined as $r_{ps} := s(\theta) - p$; wherein p is the position of the drone; wherein s(θ) is a function representing the virtual rail; s(θ*) is the point along the virtual rail which is closest to the drone; n is a tangent to the virtual rail, wherein n is defined as $$n = \frac{s'}{\|s'\|} \text{ with } s' = \frac{\partial s(\theta)}{\partial \theta}.$$

3. The drone according to claim 1, wherein the controller is further configured to,
   determine a $n^{th}$ order tailor approximation of the virtual rail to provide a differentiable path (σ(θ));
   and wherein the controller is configured to approximate the lag error ($\epsilon_L$) by, $$\epsilon_L(p,\theta) = \|r_{ps}^T n\|$$

wherein p is the position of the drone; wherein θ is a parameter representing a point along the $n^{th}$ order tailor approximation of the virtual rail; $r_{ps}$ is a relative vector between the $n^{th}$ order tailor approximation of the virtual rail and the position of the drone, defined as $r_{ps} := \sigma(\theta) - p$; wherein p is the position of the drone; wherein σ(θ) is a function representing the $n^{th}$ order tailor approximation of the virtual rail; σ(θ*) is a point along the $n^{th}$ order tailor approximation of the virtual rail which is closest to the drone; and wherein n is the tangent to the $n^{th}$ order tailor approximation of the virtual rail and is defined as $$n = \frac{\sigma'}{\|\sigma'\|} \text{ with } \sigma' = \frac{\partial \sigma(\theta)}{\partial \theta}$$

and wherein the controller is configured to approximate the contour error ($\epsilon_c$) by, $$\epsilon_c(p,\theta) = \|r_{ps}^T n)n\|$$

wherein p is the position of the drone; wherein $\theta$ is a parameter representing a point along the $n^{th}$ order tailor approximation of the virtual rail; $r_{ps}$ is a relative vector between the $n^{th}$ order tailor approximation of the virtual rail and the position of the drone, defined as $r_{ps} := \sigma(\theta) - p$; wherein p is the position of the drone; wherein $\sigma(\theta)$ is a function representing the $n^{th}$ order tailor approximation of the virtual rail; $\sigma(\theta^*)$ is a point along the $n^{th}$ order tailor approximation of the virtual rail which is closest to the drone; and wherein n is the tangent to the $n^{th}$ order tailor approximation of the virtual rail and is defined as $$n = \frac{\sigma'}{\|\sigma'\|} \text{ with } \sigma' = \frac{\partial \sigma(\theta)}{\partial \theta}.$$

4. The drone according to claim 1 wherein the controller is configured to carry out the step of defining a cost function which comprises at least said approximation of the lag error and said approximation of the contour error, by defining the cost function as $$J_k = a_p c_p(p,\theta)$$

wherein $a_p \in [0$ and $\infty]$ is a weight parameter, and $c_p$ is defined as: $c_p(p,\theta) = \|E\|_{Q_p}$ with $E = [\epsilon_l, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error.

5. The drone according to claim 1 wherein the controller is configured to carry out the step of defining a cost function which comprises at least said approximation of the lag error and said approximation of the contour error, by defining the cost function as $$J_k = a_p c_p(p,\theta) + a_{coll} c_{coll}$$

wherein $a_p \in [0$ and $\infty]$ is a weight parameter, and $c_p$ is defined as: $c_p(p,\theta) = \|E\|_{Q_p}$ with $E = [\epsilon_l, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error; wherein $a_{coll} \in [0$ and $\infty]$ is a weight factor and $$c_{coll} = \begin{cases} \|d_c\| & \text{if } d_c > 0 \\ 0 & \text{else} \end{cases}$$

wherein $d_c = \|r_{ct}\|_{\Omega_c} - 1$, $r_{ct} = \iota - p$ is a vector between geometric middle point of the drone and the geometric middle point of a subject which the drone is to avoid collision with; and $\Omega_c$ is a predefined region around said subject which the drone is not permitted to enter.

6. The drone according to claim 4, wherein the cost function further includes parameters:

$$a_{pv}, c_{pv}$$

wherein $a_{pv} \in [0$ and $\infty]$ is a weight parameter, and $c_{pv} = v^T n - \eta$ wherein v is the velocity of the drone; $\eta$ is a predefined target velocity; n is a tangent to the virtual rail, wherein n is defined as $$n = \frac{s'}{\|s'\|} \text{ with } s' = \frac{\partial s(\theta)}{\partial \theta}.$$

7. The drone according to claim 1 wherein said drone further comprises a camera mounted thereon which can be operated to capture images of a subject; and wherein the controller is configured to carry out the step of defining a cost function which comprises at least said approximation of the lag error and said approximation of the contour error, by defining the cost function as:

$$J_k = a_p c_p(p,\theta) + a_{coll} c_{coll} + a_i c_i$$

wherein $a_p \in [0$ and $\infty]$ is a weight parameter, and $c_p$ is defined as: $c_p(p,\theta) = \|E\|_{Q_p}$ with $E = [\epsilon_l, \epsilon_c]^T$, wherein p is the position of the drone, and $\theta$ represents either a point along the virtual rail or a point along an $n^{th}$ order tailor approximation of the virtual rail; and wherein $\epsilon_c$ is said approximation of the contour error, and $\epsilon_l$ is said approximation of the lag error; wherein $a_{coll} \in [0$ and $\infty]$ is a weight factor and $$c_{coll} = \begin{cases} \|d_c\| & \text{if } d_c > 0 \\ 0 & \text{else} \end{cases}$$

wherein $d_c = \|r_{ct}\|_{\Omega_c} - 1$, $r_{ct} = \iota - p$ is a vector between geometric middle point of the drone and the geometric middle point of said subject; and $\Omega_c$ is a predefined region around said subject which the drone is not permitted to enter; wherein $a_i \in [0$ and $\infty]$ is a weight parameter; and $$c_i = \|\epsilon_m\|_Q$$

$$\text{wherein } \epsilon_m = \frac{r_c}{\|r_c\|} - \frac{r_d}{\|\gamma_d\|}$$

$$\text{wherein } r_c = R(p - l),$$

wherein R is a rotation matrix (well known in the art) which describes the rotation from the live scene to a camera frame of said camera; p is the position of the drone; $\iota$ is the position of said subject; $r_d$ is then a vector pointing from a centre of the camera to a desired projection of the subject position on the image plane; $r_d = [m_d, 1]^T$ wherein $m_d$ the intersection of a ray $m_d = [(\mu_x - C_x)f_x, (\mu_y - C_y)f_y]^T$ wherein $\mu_x, \mu_y$ are coordinates representing the position of pixels in a pixel array of the camera which are to receive light which is reflected from the subject, and wherein $C_x, C_y$ are coordinates representing the position of focal point and $f_x, f_y$ the focal length of the camera in the camera coordinate Frame.

8. The drone according to claim 7 wherein the cost function further comprises the parameters:

$$a_d c_d$$

wherein $$c_d = \|\|\iota - p\|_2 - \sigma_d\|_{Q_d}$$

And wherein $\sigma_d$ is a predefined distanced from said subject which the camera is to remain;

and wherein $a_d \in [0$ and $\infty]$ is a weight parameter.

9. The drone according to claim 7, wherein the cost function further comprises the parameters:

$$a_c c_c$$

wherein $a_c \in [0$ and $\infty]$ is a weight parameter; and wherein $$c_c = \begin{cases} \|d_d\| & \text{if } d_d > 0 \\ 0 & \text{else} \end{cases}$$

wherein $d_d = \|r_{ij}\|_{\Omega_c} - 1$, $r_{ij} = p_i - p$ is the vector between the position of the drone p and the position $p_i$ of another drone i; and $\Omega_d$ is a predefined region around said other drone i which the drone is not permitted to enter.

10. The drone according to claim 7, wherein a plurality of drones each having a camera mounted thereon is provided, and wherein the cost function further comprises the parameters:

$$a_v c_v$$

wherein $a_v \in [0$ and $\infty]$ is a weight parameter; and wherein $$c_v = \begin{cases} Q_v d_{surf}^2 & \text{if } d_{surf} < 0 \\ 0 & \text{otherwise} \end{cases}$$

wherein $$d_{surf} = \|r_{ij} - p_{int}^T r_{view}\| - r_{cone}$$

With $$r_{cone} = \frac{\max(C_x, C_y)}{\max(f_x, f_y)} c_{int},$$

$c_{int} = r_{ij}^T r_{view}$, $p_{int} = c_{int} r_{view}$, $r_{ij} = p_i - p$ and $Q_v$ is a weight, wherein if $d_{surf} > 0$ then a drone j is outside of the field of view of the camera of another drone i, and if $d_{surf} < 0$, then the drone j is present in the field of view of the camera of said other drone i.

11. The drone according to claim 1, wherein the controller is further configured to receive one or more predefining constraints, and wherein the controller is configured to respect said one or more predefined constraints when minimizing the cost function.

12. The drone according to claim 11 wherein said one or more constraints comprise one or more of constraints on the state of the drone, wherein said state of the drone may comprise the position which the drone occupies and/or the speed of the drone; constraints on the control input; constraints on the distance which the drone can travel; a constraint that the drone must avoid collision with a subject; a constraint that the drone must avoid collision with a another drone.

13. The drone according to claim 1 wherein the controller is further configured to determine an allowable flying zone along a virtual rail, using one or more predefined radius values, wherein the step of defining a cost function which comprises at least said approximation of the lag error and said approximation of the contour error comprises, defining the cost function as:

$$J_k = a_p c_p(p, \theta) + c_t$$

and wherein $$e_s = \|r_{ps} - (r^T z_n) z_n\|_2$$

$$e_b = \|r_{ps} - (r^T x) x_n\|_2$$

wherein $$z_n = \frac{z_t}{\|z_t\|}$$

where $z_t = x_n \times n$, $$x_n = \frac{b_n}{\|b_n\|},$$

$$b_n = n \times z_g$$

and $z_g = [0, 0, 1]^T$ is a vector along the direction of gravity, and $r_{ps}$ is a relative vector between the virtual rail and the position of the drone, defined as $r_{ps} := s(\theta) - p$; wherein p is the position of the drone; wherein $s(\theta)$ is a function representing the virtual rail; $s(\theta^*)$ is the point along the virtual rail which is closest to the drone; n is a tangent to the virtual rail, wherein n is defined as $$n = \frac{s(\theta)'}{\|s(\theta)'\|} \text{ with } s(\theta)' = \frac{\partial s(\theta)}{\partial \theta},$$

and wherein $$d_{tube} = \left(\frac{e_s^2}{a_s^2} + \frac{e_b^2}{a_b^2}\right)^{\frac{1}{2}}$$

wherein $$c_t = \begin{cases} a_t d_{tube} & \text{if } d_{tube} > 0 \\ 0 & \text{otherwise} \end{cases}$$

and $a_t \in [0$ and $\infty]$ is a weight factor; and wherein $a_s(\theta)$ and $a_b(\theta)$ are each radii functions.

14. The drone according to claim 1 wherein the controller is further configured to determine an allowable flying zone along an $n^{th}$ order tailor approximation of a virtual rail, using one or more predefined radius values, wherein the step of defining a cost function which comprises at least said approximation of the lag error and said approximation of the contour error comprises, defining the cost function as:

$$J_k = a_p c_p(p, \theta) + c_t$$

and wherein $$e_s = \|r_{ps} - (r^T z_n) z_n\|_2$$

$$e_b = \|r_{ps} - (r^T x) x_n\|_2$$

wherein $$z_n = \frac{z_t}{\|z_t\|}$$

-continued where $z_t = x_n \times n$, $$x_n = \frac{b_n}{\|b_n\|},$$

$$b_n = n \times z_g$$

and $z_g = [0,0,1]^T$ is a vector along the direction of gravity, and $r_{ps}$ is a relative vector between the virtual rail and the position of the drone, defined as $r_{ps} := s(\theta) - p$; wherein p is the position of the drone; wherein $s(\theta)$ is a function representing the virtual rail; $s(\theta^*)$ is the point along the virtual rail which is closest to the drone; n is a tangent to the virtual rail, wherein n is defined as $$n = \frac{s(\theta)'}{\|s(\theta)'\|} \text{ with } s(\theta)' = \frac{\partial s(\theta)}{\partial \theta},$$

and wherein $$d_{tube} = \left(\frac{e_s^2}{a_s^2} + \frac{e_b^2}{a_b^2}\right)^{\frac{1}{2}}$$

wherein $$c_t = \begin{cases} a_t d_{tube} & \text{if } d_{tube} > 0 \\ 0 & \text{otherwise} \end{cases}$$

and $a_t \in [0 \text{ and } \infty]$ is a weight factor; and wherein $a_s(\theta)$ and $a_b(\theta)$ are each radii functions.

15. A method for controlling the flight of a drone which comprises one or more propellers and one or more actuators for actuating said one or more propellers to generate a thrust force which enables the drone to fly; a controller which is configured such that it can control the flight of the drone, wherein the controller comprises a memory having stored therein a plurality of predefined sets of positions which define a virtual rail which can be used to guide the flight of the drone so that the drone can avoid collision with an subject, and wherein the controller further comprises a mathematical model of the drone; the method comprising the steps of, (a) approximating a lag error based on the position of the drone measured by a sensor and the virtual rail, wherein the lag error is the distance between a point along the virtual rail which is closest to the drone and an estimate of said point along the virtual rail which is closest to the drone;

(b) approximating a contour error based on the position of the drone as measured by a sensor and the virtual rail, wherein the contour error is the distance between a point along the virtual rail which is closest to the drone and the position of the drone;

(c) defining a cost function which comprises at least said approximation of the lag error and said approximation of the contour error;

(d) minimizing the defined cost function, while also respecting at least limitations of the drone which are defined in said mathematical model, to determine a plurality of control inputs over a predefined time period into the future, and (e) applying the first control input only to the one or more actuators.

* * * * *